United States Patent
Gong et al.

(10) Patent No.: US 8,306,010 B2
(45) Date of Patent: Nov. 6, 2012

(54) SYSTEMS AND METHODS FOR UPLINK MULTI-USER MULTIPLE INPUT MULTIPLE OUTPUT (MU MIMO) MEDIUM ACCESS AND ERROR RECOVERY

(75) Inventors: Michelle X Gong, Sunnyvale, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 12/769,410

(22) Filed: Apr. 28, 2010

(65) Prior Publication Data

US 2011/0268094 A1 Nov. 3, 2011

(51) Int. Cl.
*H04B 7/04* (2006.01)
*H04W 74/06* (2009.01)
*H04W 80/02* (2009.01)
*H04W 88/02* (2009.01)
*H04L 1/16* (2006.01)

(52) U.S. Cl. ..................................................... 370/346
(58) Field of Classification Search ................... 370/346
See application file for complete search history.

(56) References Cited

U.S. PATENT DOCUMENTS

| | | | |
|---|---|---|---|
| 2003/0063563 A1 | 4/2003 | Kowalski | |
| 2008/0095091 A1 | 4/2008 | Surineni et al. | |
| 2008/0165713 A1 | 7/2008 | Nishibayashi et al. | |
| 2009/0041144 A1 | 2/2009 | Biswas et al. | |
| 2011/0090855 A1* | 4/2011 | Kim | 370/329 |
| 2011/0150004 A1* | 6/2011 | Denteneer et al. | 370/476 |
| 2011/0164597 A1* | 7/2011 | Amini et al. | 370/338 |
| 2011/0305205 A1* | 12/2011 | Gong et al. | 370/329 |
| 2012/0008572 A1* | 1/2012 | Gong et al. | 370/329 |

FOREIGN PATENT DOCUMENTS

| | | |
|---|---|---|
| JP | 2010-045784 A | 2/2010 |
| WO | 2011/139457 A2 | 11/2011 |

OTHER PUBLICATIONS

International Search Report and Written Opinion received for PCT Patent Application No. PCT/US2011/031171, mailed on Nov. 30, 2011, 8 pages.
Stacey et al., "802.11 Very High Throughput Preamble Signaling Field With Legacy Compatibility", U.S. Appl. No. 12/644,475, filed Dec. 22, 2009.
Office Action received for Japanese Patent Application. No. 2011-093875, mailed Jul. 3, 2012, 7 pages, including 4 pages of English translation.

* cited by examiner

Primary Examiner — Melvin Marcelo
(74) Attorney, Agent, or Firm — Scott M. Lane (57) ABSTRACT

Embodiments of systems and methods for uplink multi-user multiple input multiple output (MU MIMO) medium access and error recovery are generally described herein. Other embodiments may be described and claimed.

20 Claims, 7 Drawing Sheets

SYSTEMS AND METHODS FOR UPLINK MULTI-USER MULTIPLE INPUT MULTIPLE OUTPUT (MU MIMO) MEDIUM ACCESS AND ERROR RECOVERY

TECHNICAL FIELD

The present disclosure relates generally to the field of wireless communications and more particularly to systems and related methods for improving network capacity in a wireless environment.

BACKGROUND

Wireless local area networks (WLAN)s using communication protocols such as the IEEE 802.11 set of standards provide over the air modulation techniques for the transfer of data using wireless signals. Standards within the 802.11 set of standards, such as IEEE 802.11n, provide features to allow communication using multiple input multiple output (MIMO) techniques. To reduce latency between communications among several transmitting STAs, some multi-carrier communication stations may be configured to receive communications from several transmitting STAs concurrently in time and frequency. Working groups within IEEE 802.11 such as 802.11ac are establishing methods for very high throughput in a basic service set (BSS) to increase network capacity through use of uplink (UL) multi-user (MU) MIMO techniques.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for improving communications in a wireless communication network through fair medium sharing and for enabling error recovery in the network are set forth to provide a thorough understanding of embodiments of the invention. However, it will be understood by those skilled in the art that the invention may be practiced without these specific details. In other instances, well-known methods, procedures, components and circuits have not been described in detail so as not to obscure embodiments of the invention.

One approach to increasing network capacity of a basic service set (BSS) of a wireless communication network is to enable polled transmission opportunity (TXOP) support and fair medium sharing among uplink (UL) multi-user (MU) MIMO capable stations (STA)s and STAs not configured for UL MU MIMO communications. It would be a further advance in the art to provide error recovery for UL MU MIMO communications.

Some STAs capable of UL MU MIMO communication may not be configured to contend in the wireless communication network or medium to transfer packets and data. For UL MU MIMO STAs that do not contend in the medium, a TXOP request (TXR) is transmitted by the STA when it has packets to transmit to an access point (AP). Upon receiving a plurality of TXRs, the AP transmits a TX send (TXS) to poll STAs in the wireless communication network for UL MU MIMO transmission. In this embodiment, the TXS identifies the STAs being polled and sets a network allocation vector (NAV) for the TXOP. However in this embodiment, if there are also STAs in the wireless communication network configured to contend to transmit packets in the network, then those STAs not configured to contend will have to wait for the AP to poll them before the STAs not configured to contend in the network can transmit their packets. It would be helpful to enable polled TXOP support and fair medium sharing among UL MU MIMO capable STAs and STAs not configured to contend for UL MU MIMO communications in the network. It would also be helpful in those embodiments to provide error recovery for UL MU MIMO communications.

Figure 1:
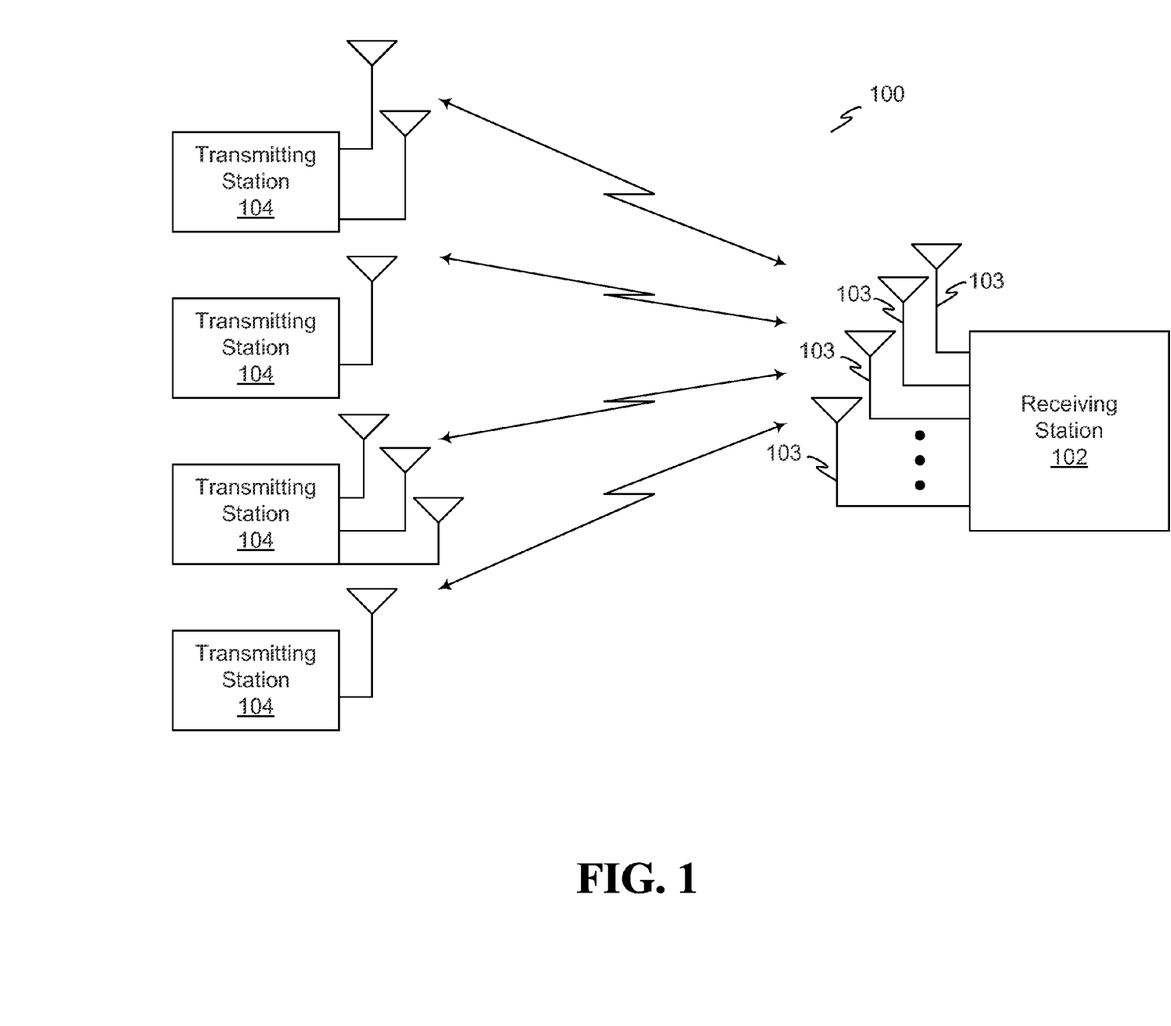
FIG. 1 is a block diagram illustrating a wireless communication network in accordance with embodiments of the invention.

Now turning to the figures, FIG. 1 illustrates a block diagram of STAs or platforms in a network, such as a wireless network 100. Some embodiments of the invention may be embodied through a wireless communication station, a mobile station, an advanced station, a client, a platform, a wireless communication device, a wireless AP, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook.

Alternately or in combination, the STAs or platforms can also use signals to communicate in the wireless network 100 such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

In one embodiment, STAs or platforms in the wireless network 100 may operate in accordance with one or more of the IEEE 802.11 standards and/or protocol under development by associated task groups such as 802.11 TGac. A STA operating in accordance with these protocols and/or standards may require the implementation of at least two layers. One layer is the 802.11 MAC layer (i.e., OSI Data/Link Layer 2). In general, the MAC layer manages and maintains communications between 802.11 devices by coordinating access to a shared radio channel. For example, the MAC layer may perform such operations as scanning for 802.11 devices, authenticating 802.11 devices, associating a first STA with a second STA, performing security techniques such as wireless encryption protocol (WEP), request to send (RTS) and clear to send (CTS) operations, power saving operations, fragmentation operations, to receive data, and to generate a MAC protocol data unit (MPDU) or aggregate MPDU among with other tasks.

Another layer is the 802.11 PHY layer (i.e., OSI Physical Layer 1). The PHY layer may perform the operations of carrier sensing, transmission, and receiving of 802.11 frames among other tasks. For example, the PHY layer may integrate operations such as modulation, demodulation, encoding, decoding, analog-to-digital conversion, digital-to-analog conversion, filtering, to receive the MPDU or A-MPDU, to generate a preamble and a PHY header among other tasks. The PHY layer may be implemented using dedicated hardware or through software emulation. The MAC layer may be implemented using either or a combination of dedicated hardware and dedicated software.

As illustrated in FIG. 1, wireless network 100 comprises receiving station (STA) 102 and one or more of a plurality of transmitting STAs (STAs) 104. Receiving STA 102 may provide for communications between associated transmitting STAs 104 and may allow associated transmitting STAs 104 to communicate with one or more external networks, such as the Internet.

In some embodiments, receiving STA 102 may be a wireless access point (AP), such as a Wireless Fidelity (WiFi), Worldwide Interoperability for Microwave Access (WiMax), or broadband communication station, although the scope of the invention is not limited in this respect as receiving STA 102 may be almost any communication station. In some embodiments, transmitting STAs 104 may be communication stations (STAs) or mobile STAs such as WiFi, WiMax, or broadband communication stations, although the scope of the invention is not limited in this respect. The receiving STA 102 and transmitting STAs 104 are designated herein in the context of UL MU MIMO operations, however it is understood that each receiving STA 102 and each transmitting STA 104 is configured with receiving means and transmitting means for transmission and reception of signals in the wireless network 100.

In accordance with some embodiments of the present invention, receiving STA 102 employs a multi-user uplink with more than one of associated transmitting STAs 104. In these embodiments, latency may be reduced for applications operating on selected associated transmitting STAs 104. The applications may include time-sensitive applications, such as voice over IP (VoIP) or streamed video applications, which may have time-sensitive packet transmission requirements. In some embodiments, the applications may include applications having quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications such applications that communicate best-effort traffic as well as background traffic. Although some embodiments of the present invention are described reducing latency for time-sensitive applications, the scope of the invention is not limited in this respect, as some embodiments are equally applicable to almost any communication application operating on a transmitting STA 104. In some embodiments, time-sensitive applications may refer to any communication application having a packet-latency requirement.

In some embodiments, power consumption of associated communications stations may also be reduced. In some embodiments, receiving STA 102 may substantially simultaneously or concurrently receive uplink data through two or more receive antennas from two or more associated transmitting STAs 104 on the same frequency subcarriers of a multi-carrier communication channel. In these embodiments, receiving STA 102 may internally separate the uplink data transmitted by the two or more associated transmitting STAs 104 using channel estimates for each associated transmitting STA from which a transmission is received. In some embodiments, receiving STA 102 may take advantage of the antenna diversity resulting from differently located associated transmitting STAs.

In accordance with some embodiments of the present invention, receiving STA 102 receives long and short frequency-interleaved orthogonal training signals that were concurrently transmitted from transmitting STAs 104. The training signals are received through each receive antenna 103 of receiving STA 102. Receiving STA 102 generates channel estimates and carrier frequency offset (CFO) estimates for each of the transmitting STAs 104 from the received training signals by performing an iterative decoding process using previously generated channel estimates and previously generated CFO estimates to cancel intercarrier interference (ICI) from the received training signals present due to loss of orthogonality induced by carrier frequency offsets.

In some embodiments, transmitting STAs 104 are polled to simultaneously or concurrently respond. Each transmitting STA 104 may use part of a standard preamble so that transmitting STAs 104 together form a virtual MIMO system. Receiving STA 102 may have an equal or greater number of antennas 103 in a transceiver array, wherein the transceiver array is configured for to receive and transmit signals, than the number of selected transmitting STAs 104 to resolve the spatial streams transmitted by each transmitting STA. In some of these embodiments, initial CFO estimation is performed during the receipt of a short training field (STF) and CFO correction along with channel estimation is performed during receipt of a long training field (LTF) or preamble. In some of these embodiments, each packet may include the STF, the LTF, a data field and a cyclic prefix, although the scope of the invention is not limited in this respect.

Figure 2:
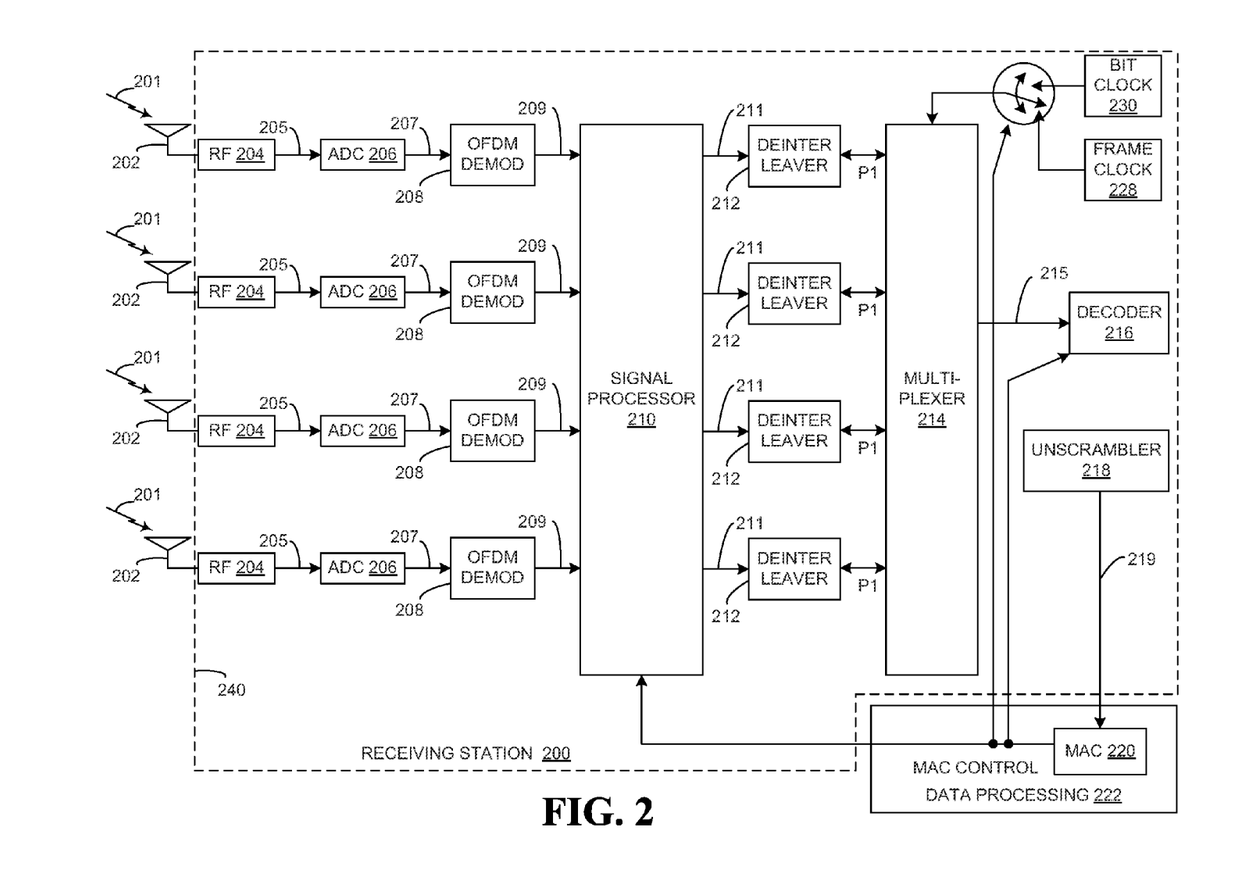
FIG. 2 is a block diagram of a receiving station in accordance with some embodiments of the invention.

FIG. 2 is a block diagram of a receiving station 200 in accordance with some embodiments of the invention. Receiving station 200 may correspond to receiving STA 102 (FIG. 1), although other configurations may also be suitable. Transmitting STAs 104 (FIG. 1) may be similarly configured, although the scope of the invention is not limited in this respect. Receiving station 200 may receive multicarrier communication signals 201, such as orthogonal frequency division multiplexed (OFDM) signals or orthogonal frequency division multiple access (OFDMA) signals, and may generate physical (PHY) layer output data 219 for media access control (MAC) layer 220.

Receiving station 200 may comprise a plurality of receive antennas 202 in a transceiver array to receive communications from associated transmitting STAs 104 (FIG. 1), radio-frequency (RF) receiver circuitry 204 associated with each of antennas 202 to generate baseband signals 205, and analog-to-digital conversion (ADC) circuitry 206 to generate digital signals 207 associated with each receive antenna 202. Receiving station 200 may also comprise demodulators 208 to generate demodulated signals 209. In some embodiments, demodulators 208 may comprise OFDM or OFDMA demodulators, although the scope of the invention is not limited in this respect.

Signal processor 210 may also perform an equalization and may demap constellations to frequency-domain symbols for each subcarrier to generate a data stream 211 associated with each transmitting STA 104 (FIG. 1). In some embodiments, signal processor 210 may generate channel estimates and carrier frequency offset (CFO) estimates for each of the transmitting STAs 104 (FIG. 1) from the received training signals. In some embodiments, signal processor 210 may perform an iterative decoding process using previously generated channel estimates and previously generated CFO estimates to cancel intercarrier interference (ICI) from the received training signals present due to loss of orthogonality induced by carrier frequency offsets.

Receiving station 200 may also comprise deinterleavers 212 to perform deinterleaving operations on bits 211 and multiplexer 214 to multiplex the bits from deinterleavers 212 to generate frames 215 based on boundary information provided by bit clock 230 or frame clock 228. Receiving station 200 may also comprise decoder 216 to decode frames 215, and unscrambler 218 to unscramble the decoded frames to generate PHY layer output data 219, although the scope of the invention is not limited in this respect.

Receiving station 200 includes data processing circuitry 222, which may include MAC layer 220. Data processing circuitry 222 may select a predetermined number of transmitting STAs based on a number of receive antennas 202 available to receive communication signals from the transmitting STAs over a multi-user uplink. In some embodiments, receiving station 200 may use up to four receive antennas 202 for receiving communication signals 201 from up to four associated transmitting STAs. In some embodiments, receiving station 200 may use up to ten or more receive antennas 202 for receiving communication signals 201 from up to ten or more associated transmitting STAs.

In some embodiments, receiving station 102 may transmit and/or receive OFDM or OFDMA communication signals over a multicarrier communication channel. These multicarrier communication signals may be within a predetermined frequency spectrum and may comprise a plurality of orthogonal subcarriers. In some embodiments, the orthogonal subcarriers may be closely-spaced subcarriers. To help achieve orthogonality between the closely-spaced subcarriers, each subcarrier may have a null at substantially a center frequency of the other subcarriers. In some embodiments, to help achieve orthogonality between the closely-spaced subcarriers, each subcarrier may have an integer number of cycles within a symbol period, although the scope of the invention is not limited in this respect.

In some embodiments, the frequency spectrums for the multicarrier communication signals communicated between receiving STA 102 (FIG. 1) and associated transmitting STAs 104 (FIG. 1) may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and II GHz, although the scope of the invention is not limited in this respect.

Antennas 202 may comprise directional or omnidirectional antennas, including, for example, dipole antennas, monopole antennas, patch antennas, loop antennas, microstrip antennas or other types of antennas suitable for reception and/or transmission of RF signals. Although receiving station 200 is illustrated in FIG. 2 as having four antennas 202 and four associated receive signal paths, the scope of the invention is not limited in this respect. In some embodiments, receiving station 200 may have as few as two receive antennas and as many as ten or more antennas in a transceiver array.

In some embodiments, bit clock 230 may provide bit boundaries to the multiplexer 214 when signal processing circuitry 210 generates data received from a single associated transmitting STA 104 (FIG. 1). Switching element 232 may selectively couple either bit clock 230 or frame clock 228 with the multiplexer 214. Frame clock 228 may be coupled when uplink data is being received substantially simultaneously from two or more selected transmitting STAs 104, while bit clock 230 may be coupled when uplink data is being received at different times from different transmitting STAs 104 (i.e., when communicating in a standard mode).

Figure 3:
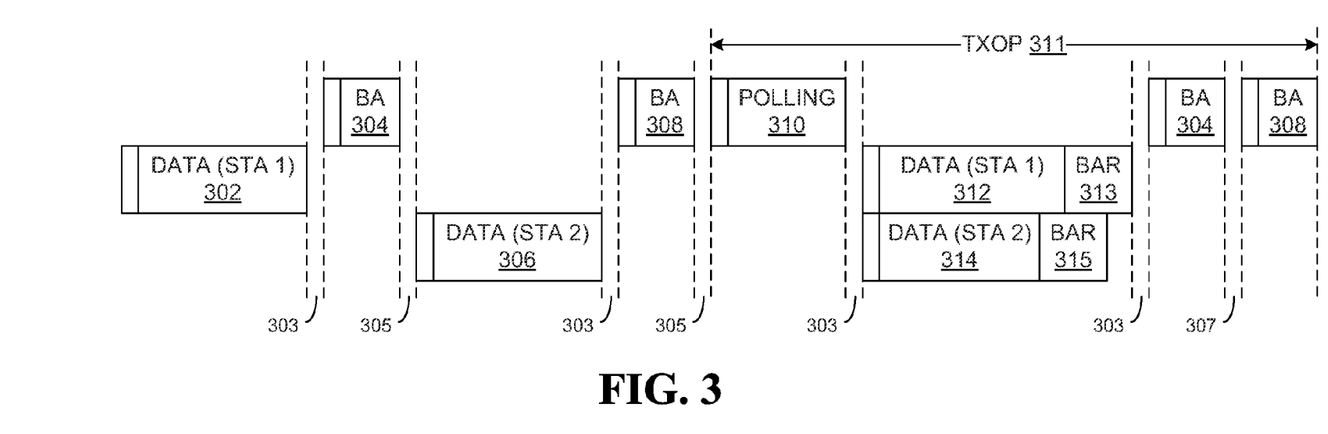
FIG. 3 is a block diagram of an UL MU MIMO operation in accordance with some embodiments of the invention.

The receiving STA 102 and a number of the transmitting STAs 104 may operate in the wireless network 100 using UL MU MIMO techniques. FIG. 3 is a block diagram of an UL MU MIMO operation using an opportunistic polling mechanism in accordance with some embodiments of the invention. Two transmitting STAs 104 and a receiving STA 102 are used in this embodiment, however additional transmitting STAs 104 and/or receiving STAs 102 may also be present in the wireless network 100. The receiving STA 102 and the number of transmitting STAs 104 form a basic service set (BSS) known to one skilled in the art, wherein the stations (e.g. 102 and 104) contend to transmit data frames or packets. The transmitting STAs 104 in the BSS may all be configured for UL MU MIMO communication. Alternatively, one or more subsets of transmitting STAs 104 in the BSS may be configured for UL MU MIMO communication.

An embodiment of frame types or sub-types for the data frames are described in Table 1.

TABLE 1

Queue Size Indication in a QoS Control Field

| Frame (sub) types | Bits 0-3 | Bit 4 | Bits 5-6 | Bit 7 | Bits 8-15 |
|---|---|---|---|---|---|
| QoS(+)CF-Poll frames sent by hybrid coordinator (HC) | TID | EOSP | Ack Policy | Reserved | TXOP Limit |
| QoS Data, QoS Null, and QoS Data + CF-Ack frames sent by HC | TID | EOSP | Ack Policy | Reserved | AP PS Buffer State |
| QoS data frames sent by non-AP STAs | TID | 0 | Ack Policy | Reserved | TXOP Duration Requested |
|  | TID | 1 | Ack Policy | Reserved | Queue Size |

Transmitting STAs 104 configured for UL MU MIMO communication may include buffered traffic information in a quality of service (QoS) control field of a MAC header of a frame, as shown in Table 1. A queue size field, represented in Table 1 as Bits 8-15 of the QoS data frames sent by the non-AP STAs such as the transmitting STAs 104, indicates an amount of remaining buffered traffic left after transmission of an aggregate MAC protocol data unit (A-MPDU) sent by a transmitting STA 104. The queue size is either indicated in the TXR message or alternatively in a MAC header of a QoS data message.

In an embodiment, STAs in the wireless network 100, including the receiving STA 102 and the transmitting STAs 104, may access the medium and transmit frames using a contention process such as enhanced distributed channel access (EDCA) and/or hybrid coordination function (HCF) controlled channel access (HCCA), which includes the ability to poll STAs in both contention and contention-free periods. Using EDCA, each STA may contend to transmit frames. The receiving STA 102 polls the transmitting STAs 104 to determine the transmitting STAs 104 that have buffered traffic. After receiving a polling frame 310, only transmitting STAs 104 that are polled can transmit in one embodiment.

The receiving STA 102 or AP receives A-MPDUs from a number of transmitting STAs 104, including a first STA data frame 302 and second STA data frame 306, and sends a first STA block acknowledgment (BA) 304 and a second STA BA 308 to the first and second transmitting STAs 104 respectively. A short interframe space 303 follows the data frames 302 and 306 while a backoff period 305 follows the block acknowledgements 304 and 308. The receiving STA 102 sends a polling frame 310 to provide a TXOP 311 in response to receiving A-MPDUs in data frames 302 and 306. For example, if more than one transmitting STAs 104 has transmitted an A-MPDU and indicated that there is remaining buffered traffic, then the receiving STA 102 may transmit a polling frame 310.

The receiving STA 102 may send the polling frame 310 after winning an EDCA contention in one embodiment. In another embodiment, the receiving STA 102 may transmit the polling frame 310 if an average medium busy time is above an established threshold. The polling frame 310 identifies the transmitting STAs 104 for subsequent UL MU MIMO transmission. Upon receiving the polling frame 310, the transmitting STAs 104 identified in the polling frame 310 transmits A-MPDUs in a first STA buffered data frame 312 and a second STA buffered data frame 314 along with a first STA BA request (BAR) 313 and second STA BAR 315 respectively.

The receiving STA 102 may poll a plurality of transmitting STAs 104 within a single TXOP 311. In an embodiment, the receiving STA 102 transmits a polling frame 310 for each UL MU MIMO transmission. Additional polling frames 310 may be sent in alternate embodiments. BA 304 is sent by the receiving STA 102 in response to receiving the first STA buffered data frame 312 and block acknowledgement 308 is sent by the receiving STA 102 in response to receiving the second STA buffered data frame 314. A reduced interframe space 307 separates the first BA 304 from the second BA 308.

If the receiving STA 102 senses the medium of the wireless network 100 as idle priority interframe space (PIFS) after transmitting the polling frame 310, the receiving STA 102 can initiate an exponential backoff and contend again to send out the polling frame 310. In an embodiment, the receiving STA 102 may follow EDCA rules by initiating the backoff and contending again using an access category (AC) priority as an AC used for pending data frames.

Figure 4:
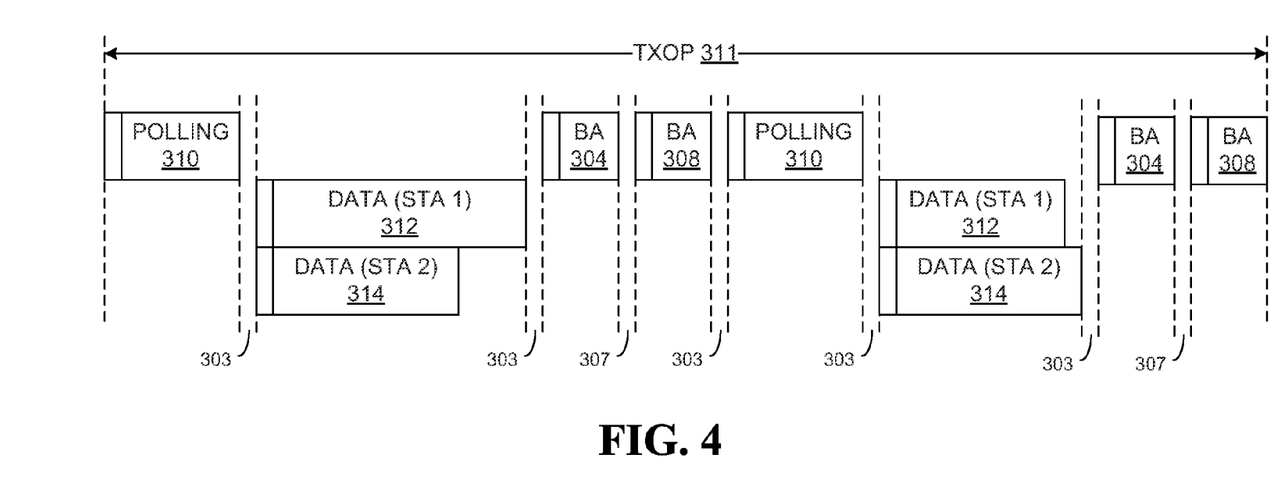
FIG. 4 is a block diagram of a transmission opportunity (TXOP) operation of UL MU MIMO in accordance with some embodiments of the invention.

FIG. 4 is a block diagram of a transmission opportunity (TXOP) operation of UL MU MIMO in accordance with some embodiments of the invention. In this embodiment, the TXOP 311 is initiated with the polling frame 310, wherein the polling frame 310 provides an opportunity for transmitting STAs 104 to send frames. Two transmitting STAs 104 transmit frames during the TXOP 311 in response to two polling frames 310. Within the TXOP 311, the receiving STA 102 is free to poll any STA in the wireless network 100. In this embodiment, other STAs within the wireless network 100 may not transmit in the TXOP without receiving a polling frame first. Two transmitting STAs 104 that transmit A-MPDUs in the frames are provided in FIG. 4, however additional transmitting STAs 104 may be polled during the TXOP 311 and the transmitting STAs 104 may transmit various types of frames such as MPDUs.

Figure 5:
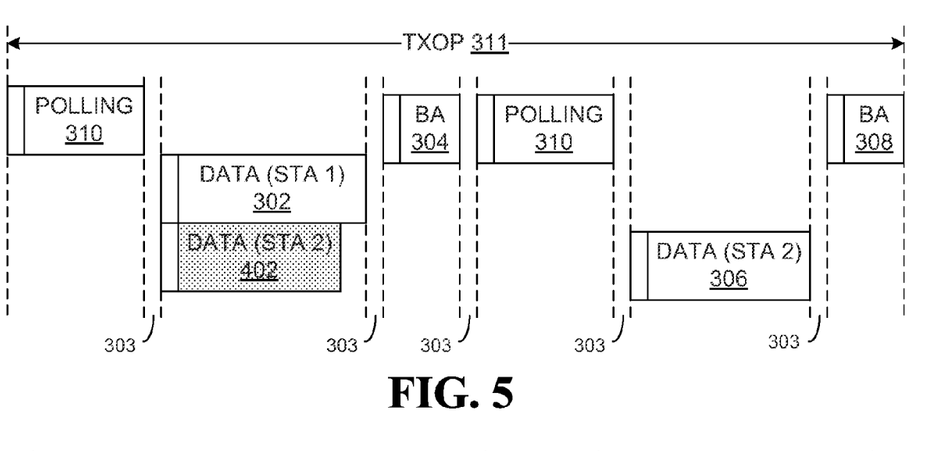
FIG. 5 is a block diagram of error recovery in a TXOP in accordance with some embodiments of the invention.

FIG. 5 is a block diagram of error recovery in a TXOP 311 in accordance with some embodiments of the invention. Error recovery is a mechanism that is used to handle a frame or frames that may not be properly decoded. The receiving STA 102 sends a polling frame 305 prompting transmitting STAs 104 to send frames, including the first STA data frame 302 and an incomplete second STA data frame 402, wherein the incomplete second STA data frame 402 is not properly received by the receiving STA 102. The first STA BA 304 is sent by the receiving STA 102 in response to the first STA data frame 302 and a polling frame 310 is sent to prompt the second STA data frame 306. Successful error recovery through reception of the second STA data frame 306 is acknowledged by the second STA BA 308.

Figure 6:
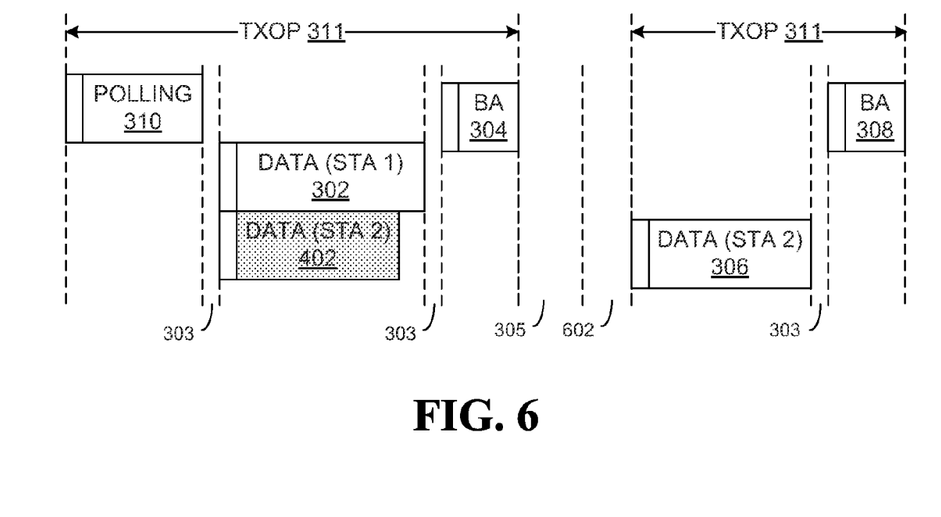
FIG. 6 is a block diagram of error recovery in a TXOP in accordance with some embodiments of the invention.

FIG. 6 is a block diagram of error recovery in TXOP 311 in accordance with other embodiments of the invention. As indicated in FIG. 6, the receiving STA 102 transmits a polling frame 310 prompting transmitting STAs 104 to transmit frames during the TXOP 311. The first STA BA 304 is sent in response to the first STA data frame 302 but a second STA BA 308 is not sent in response to the incomplete second STA data frame 402. The transmitting STA 104 or second STA that sent the incomplete second STA data frame 402 receives the first STA BA 304 but not receive the second STA BA 308.

In this embodiment, the second STA initiates success backoff by setting a contention window (CW) to a CW minimum ($CW_{min}$) wherein $CW=CW_{min}$. If the receiving STA 102 successfully receives and decodes a frame from a transmitting STA 104 in an UL MU MIMO transmission and sends back at least one block acknowledgement, such as the first STA BA 304, then the second STA may determine that there was no collision at the receiving STA 102. Other factors may have been responsible for corruption of the frame sent by the second STA, or the incomplete second STA data frame 402 such as interference, channel variation, and/or noise. As illustrated in FIG. 6, the second STA initiates exponential backoff using the backoff period 305 and an arbitration interframe space 602. In another embodiment, if a STA has more traffic or frames to send it has received at least one block acknowledgment from the receiving STA 102 even if the block acknowledgement is not directed to the STA, the STA may initiate success backoff. If no block acknowledgment is received from the receiving STA 102, the second STA initiates exponential backoff. The receiving STA 102 will initiate success backoff if at least one data packet is received successfully.

Figure 7:
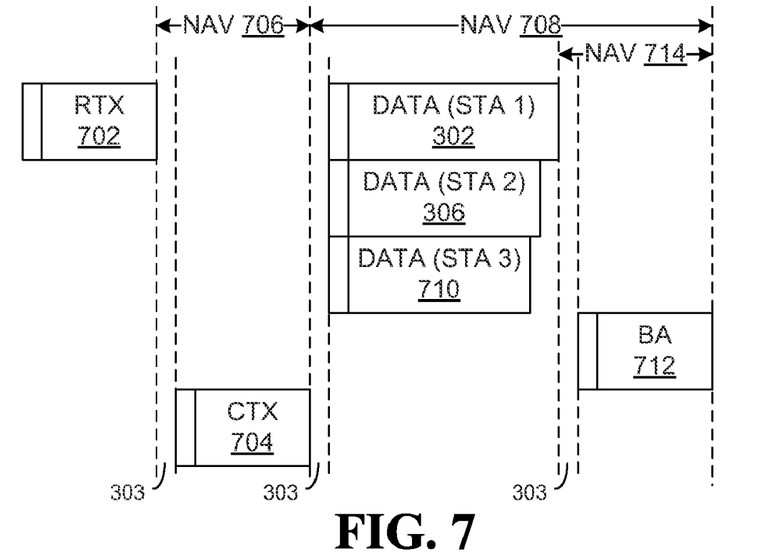
FIG. 7 is a block diagram of a TXOP in accordance with some embodiments of the invention.

FIG. 7 is a block diagram of establishment of a TXOP 311 in accordance with some embodiments of the invention. A transmitting STA 104 such as a first STA in this embodiment transmits a request to transmit (RTX) frame 702. The RTX frame 702 prompts a receiving STA 102 to send a clear to transmit (CTX) frame 704 which polls transmitting STAs 104 to transmit buffered traffic or data. The RTX frame 702 comprises information such as a MAC duration to account for transmission of the CTX frame 704 from the receiving STA 102. As an example, a RTX TXOP duration as indicated by a first network allocation vector (NAV) 706 may be expressed as:

RTX TXOP duration: SIFS+CTX_duration

Upon receiving the RTX frame 702, the receiving STA 102 transmits the CTX frame 704 to poll a number of transmitting STAs 104, wherein a CTX TXOP duration as indicated by a second NAV 708 may be expressed as:

CTX TXOP duration: Max_data_duration+SIFS+ BA_duration

The transmitting STAs 104 transmit UL data frames up to the Max Data Duration specified in the CTX frame 704. The UL data frames in this embodiment include a first STA data frame 302, a second STA data frame 306, and a third STA data frame 710. A block acknowledgement 712 is sent by the receiving STA 102 during a third NAV 714 in response to receiving the UL data frames.

Figure 8:
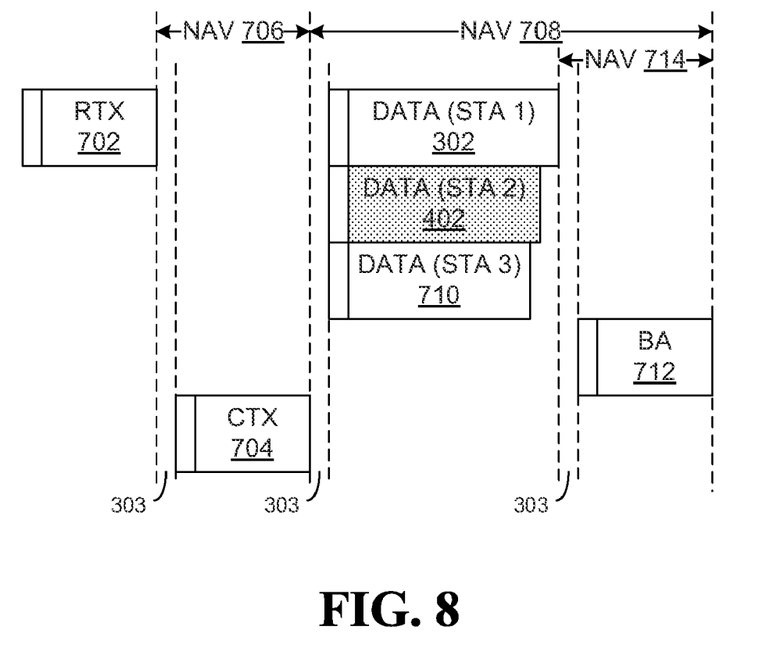
FIG. 8 is a block diagram of error recovery in a TXOP in accordance with some embodiments of the invention.

FIG. 8 is a block diagram of error recovery in a TXOP 311 in accordance with some embodiments of the invention. A transmitting STA 104 such as a first STA transmits a request to transmit (RTX) frame 702. The RTX frame 702 prompts a receiving STA 102 to send a clear to transmit (CTX) frame 704 which polls transmitting STAs 104 to transmit buffered traffic or data. If the first STA that transmitted the RTX frame 702 fails to receive the CTX frame 704, the first STA should treat it as a transmission failure and initiate an exponential backoff.

After receiving the CTX frame 704, the transmitting STAs 104 send MPDUs and/or A-MPDUs in data frames. The receiving STA 102 the CTX frame 704 to poll and prompt transmitting STAs 104 to send the data frames, including the first STA data frame 302, the third STA data frame 710 and an incomplete second STA data frame 402, wherein the incomplete second STA data frame 402 is not properly received by the receiving STA 102. The transmitting STA 104 or second STA that sent the incomplete second STA data frame 402 does not receive a BA for the second STA in the BA 712, but does receive a BA for another transmitting STA 104 from the receiving STA 102.

In this embodiment, the second STA initiates success backoff by setting a contention window (CW) to a CW minimum ($CW_{min}$) wherein $CW=CW_{min}$. If the receiving STA 102 successfully receives and decodes a frame from a transmitting STA 104 in an UL MU MIMO transmission and sends back at least one block acknowledgement, such as the BA 712, then the second STA may determine that there was no collision at the receiving STA 102. Other factors may have been responsible for corruption of the incomplete second STA data frame 402 such as interference, channel variation, and/or noise. However, if the BA 712 is not received from the receiving STA 102, then the second STA may initiate exponential backoff.

Figure 9:
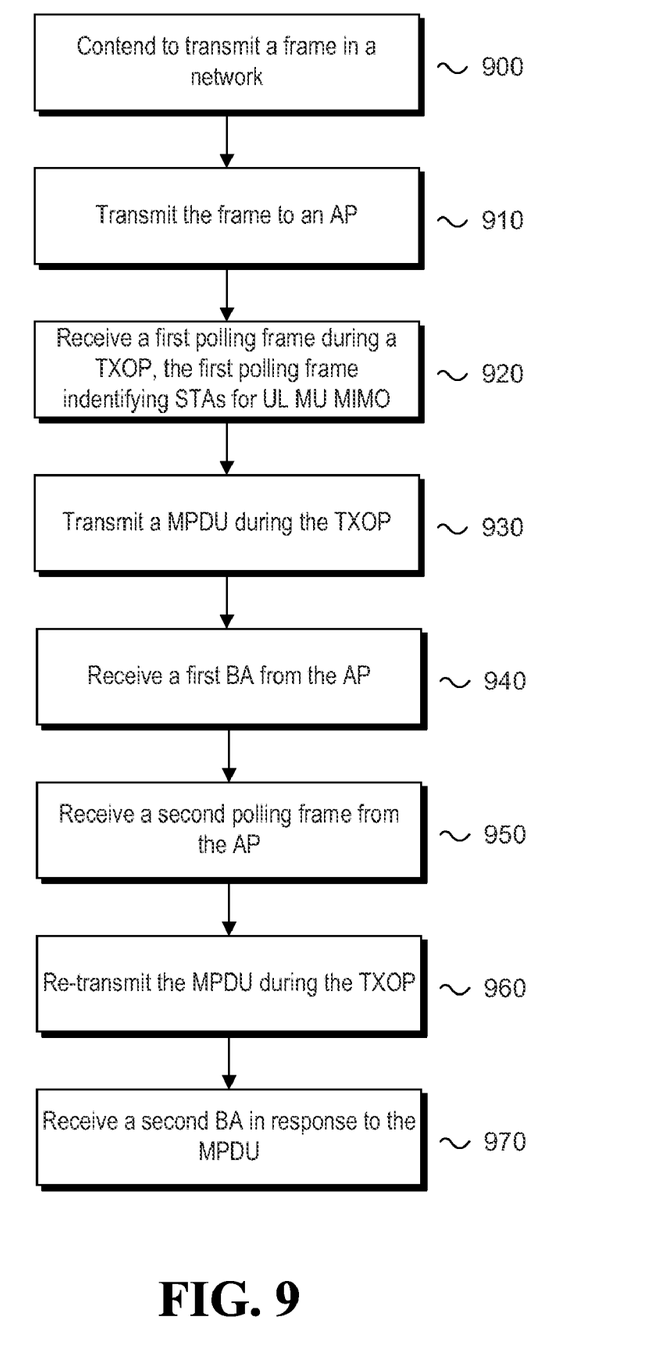
FIG. 9 is a flow diagram of UL MU MIMO communication in accordance with some embodiments of the invention.

FIG. 9 is a flow diagram of UL MU MIMO communication in accordance with some embodiments of the invention. A frame is provided and a contention process is used to transmit the frame in a network in element 900. The frame is transmitted to a receiving STA 102 or AP in element 910. A first polling frame is received during a transmission opportunity (TXOP) in element 920, wherein the first polling frame identifies STAs for UL MU MIMO communication. A MPDU is transmitted during the TXOP in element 930 and a first BA from the receiving STA 102 is received in element 940. A second polling frame is received from the receiving STA or AP in element 950 and the MPDU is retransmitted during the TXOP in element 960. A second BA is received in element 970 in response to the MPDU.

Figure 10:
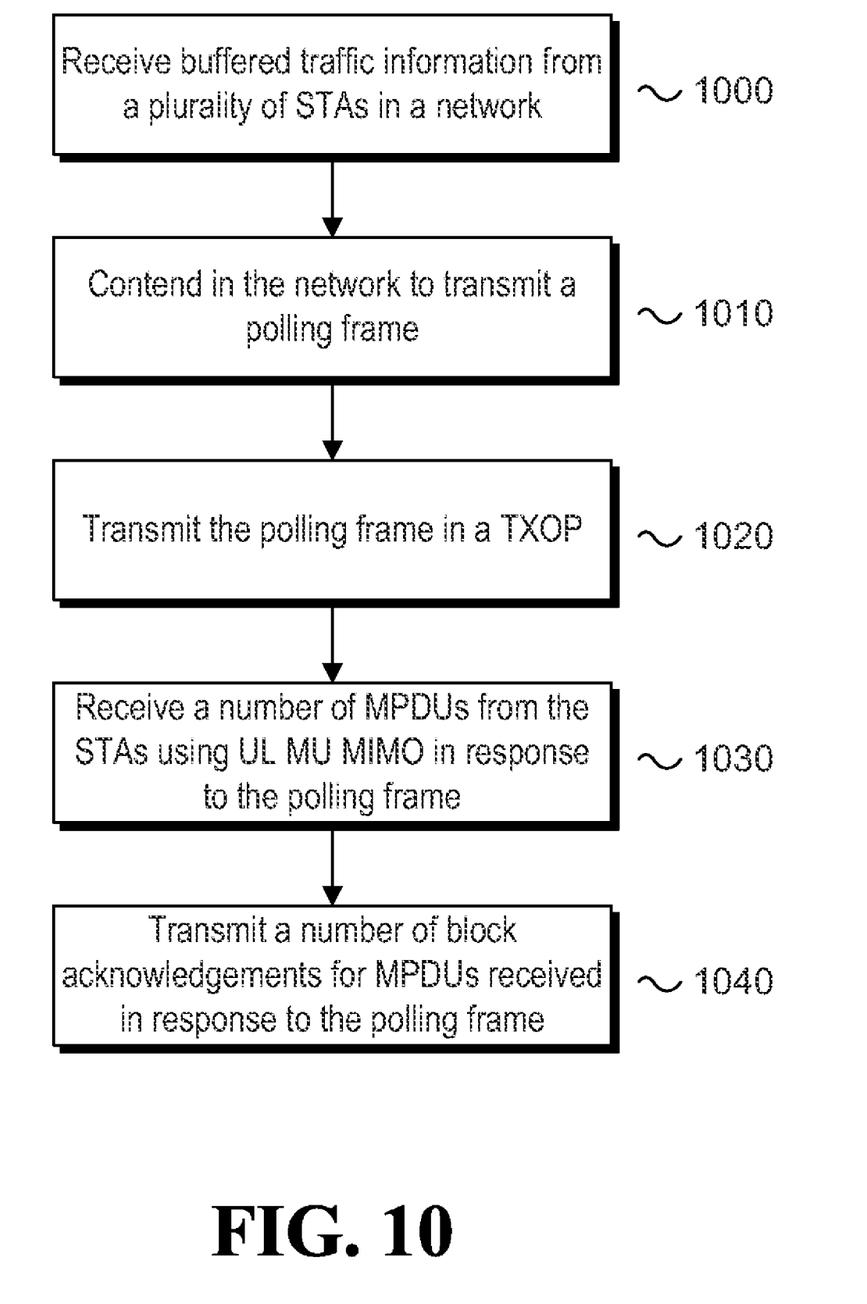
FIG. 10 is another flow diagram of UL MU MIMO communication in accordance with some embodiments of the invention.

FIG. 10 is another flow diagram of UL MU MIMO communication in accordance with some embodiments of the invention. Buffered traffic information is received by a receiving STA 102 from a plurality of transmitting STAs 104 in a wireless network 100 in element 1000. The receiving STA 102 contends in the wireless network 100 to transmit a polling frame in element 1010. The polling frame is transmitted using transmitting means in a TXOP in element 1020 and a number of MPDUs are received from the transmitting STAs 104 using UL MU MIMO in response to the polling frame in element 1030. A number of BAs are transmitted in element 1040 for MPDUs received in response to the polling frame.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the receiving station 102 or the transmitting station 104, provides UL MU MIMO communication.

The operation discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes.

What is claimed is:

1. A method of uplink multi-user multiple input multiple output (UL MU MIMO) communication using a station (STA), comprising:
   contending to transmit a frame in a network;
   transmitting the frame, wherein the frame indicates buffered data at the STA;
   receiving a first polling frame during a transmission opportunity (TXOP), wherein the first polling frame is received through a contention process and the first polling frame identifies a plurality of stations (STA)s for UL MU MIMO communication during the TXOP; and
   transmitting a MAC protocol data unit (MPDU) during the transmission opportunity (TXOP).

2. The method of claim 1, wherein the STA is part of a basic service set (BSS) comprising a plurality of STAs and wherein the MPDU is an aggregate MPDU (A-MPDU).

3. The method of claim 2, further including:
   receiving a first block acknowledgment (BA) from a receiving STA during the TXOP, wherein the BA is in response to a second MPDU received by the AP;
   receiving a second polling frame from the receiving STA;
   re-transmitting the MPDU; and
   receiving a second BA in response to the MPDU.

4. The method of claim 1, further including inserting the buffered data in the MPDU.

5. The method of claim 4, wherein the first polling frame is transmitted from a receiving STA through enhanced distributed channel access (EDCA).

6. The method of claim 4, wherein the first polling frame is transmitted from a receiving STA after exceeding a threshold of an average medium busy time.

7. A method of uplink multi-user multiple input multiple output (UL MU MIMO) communication in a network, comprising:
   receiving buffered traffic information from a plurality of stations (STA)s;
   contending in the network to transmit a polling frame;
   transmitting the polling frame in a transmission opportunity (TXOP), wherein the polling frame identifies STAs for the UL MU MIMO communication;
   receiving MAC protocol data units (MPDU)s from the STAs in response to the polling frame, wherein the MPDUs are sent concurrently during the TXOP; and
   transmitting a number of block acknowledgment (BA)s during the TXOP for MPDUs received in response to the polling frame.

8. The method of claim 7, wherein the plurality of stations are part of a basic service set (BSS) that contend to transmit data frames in the network.

9. The method of claim 8, further comprising contending in the network using enhanced distributed channel access (EDCA) and wherein the MPDUs are aggregate MPDUs (A-MPDU).

10. The method of claim 7, further including sending a second polling frame during the TXOP if an MPDU is not received from a STA identified in the polling frame.

11. The method of claim 10, further including receiving the MPDU in response to the second polling frame.

12. The method of claim 11, further including sending another BA in response to receiving the MPDU.

13. A station (STA), comprising:
   a media access controller (MAC) to receive data and to generate a MAC protocol data unit (MPDU);
   a physical layer (PHY) to receive the MPDU and to generate a preamble and a PHY header;
   a transceiver array configured to;
      transmit a frame to a receiving STA using a contention process, wherein the frame indicates buffered data at the STA;
      receive a first polling frame during a transmission opportunity (TXOP), wherein the first polling frame is received through a contention process and the first polling frame identifies a plurality of stations (STA)s for UL MU MIMO communication during the TXOP; and
      transmit the MPDU during the TXOP.

14. The STA of claim 13, wherein the MAC is embodied through a software routine.

15. The STA of claim 13, wherein the STA is part of a basic service set (BSS) comprising a plurality of STAs.

16. The STA of claim 13, wherein the STA is further configured to:
   receive a first block acknowledgment (BA) from a receiving STA during the TXOP, wherein the BA is in response to a second MPDU received by the AP;
   receive a second polling frame from the receiving STA during the TXOP;
   re-transmit the MPDU during the TXOP; and
   receive a second BA in response to the MPDU.

17. The STA of claim 13, further including inserting the buffered data in the MPDU.

18. The STA of claim 13, wherein the first polling frame is transmitted from a receiving STA through enhanced distributed channel access (EDCA).

19. The STA of claim 13, wherein the first polling frame is transmitted from a receiving STA after exceeding a threshold of an average medium busy time.

20. The STA of claim 14, wherein the PHY is embodied through a software routine.

* * * * *

UNITED STATES PATENT AND TRADEMARK OFFICE
CERTIFICATE OF CORRECTION

| | |
|---|---|
| PATENT NO. | : 8,306,010 B2 |
| APPLICATION NO. | : 12/769410 |
| DATED | : November 6, 2012 |
| INVENTOR(S) | : Michelle X Gong et al. |

It is certified that error appears in the above-identified patent and that said Letters Patent is hereby corrected as shown below:

Delete the Title page, and substitute the attached Title page, therefor.

On the Title page, in field (56), in column 2, under "Other Publications", line 5, after "filed" insert -- on --.

Delete sheet 6 and substitute the attached sheet 6, therefor.

On sheet 6 of 7, in Figure 9, Box 920, line 3, delete "indentifying" and insert -- identifying --, therefor.

Signed and Sealed this
Second Day of April, 2013

Teresa Stanek Rea
*Acting Director of the United States Patent and Trademark Office*

(12) United States Patent
Gong et al.

(10) Patent No.: US 8,306,010 B2
(45) Date of Patent: Nov. 6, 2012

(54) SYSTEMS AND METHODS FOR UPLINK MULTI-USER MULTIPLE INPUT MULTIPLE OUTPUT (MU MIMO) MEDIUM ACCESS AND ERROR RECOVERY

(75) Inventors: Michelle X Gong, Sunnyvale, CA (US); Robert Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 322 days.

(21) Appl. No.: 12/769,410

(22) Filed: Apr. 28, 2010

(65) Prior Publication Data
US 2011/0268094 A1 Nov. 3, 2011

(51) Int. Cl.
H04B 7/04 (2006.01)
H04W 74/06 (2009.01)
H04W 80/02 (2009.01)
H04W 88/02 (2009.01)
H04L 1/16 (2006.01)

(52) U.S. Cl. .......... 370/346
(58) Field of Classification Search .......... 370/346
See application file for complete search history.

(56) References Cited

U.S. PATENT DOCUMENTS

| | | | |
|---|---|---|---|
| 2003/0063563 A1 | 4/2003 | Kowalski | |
| 2008/0095091 A1 | 4/2008 | Surineni et al. | |
| 2008/0165713 A1 | 7/2008 | Nishibayashi et al. | |
| 2009/0041144 A1 | 2/2009 | Biswas et al. | |
| 2011/0090855 A1* | 4/2011 | Kim | 370/329 |
| 2011/0150004 A1* | 6/2011 | Denteneer et al. | 370/476 |
| 2011/0164597 A1* | 7/2011 | Amini et al. | 370/338 |
| 2011/0305205 A1* | 12/2011 | Gong et al. | 370/329 |
| 2012/0008572 A1* | 1/2012 | Gong et al. | 370/329 |

FOREIGN PATENT DOCUMENTS

| | | |
|---|---|---|
| JP | 2010-045784 A | 2/2010 |
| WO | 2011/139457 A2 | 11/2011 |

OTHER PUBLICATIONS

International Search Report and Written Opinion received for PCT Patent Application No. PCT/US2011/031171, mailed on Nov. 30, 2011, 8 pages.

Stacey et al., "802.11 Very High Throughput Preamble Signaling Field With Legacy Compatibility", U.S. Appl. No. 12/644,475, filed Dec. 22, 2009.

Office Action received for Japanese Patent Application. No. 2011-093875, mailed Jul. 3, 2012, 7 pages, including 4 pages of English translation.

* cited by examiner

Primary Examiner — Melvin Marcelo
(74) Attorney, Agent, or Firm — Scott M. Lane (57) ABSTRACT

Embodiments of systems and methods for uplink multi-user multiple input multiple output (MU MIMO) medium access and error recovery are generally described herein. Other embodiments may be described and claimed.

20 Claims, 7 Drawing Sheets

FIG. 9